(12) United States Patent
Romero et al.

(10) Patent No.: US 12,441,337 B2
(45) Date of Patent: Oct. 14, 2025

(54) END-TO-END PERCEPTION PERTURBATION MODELING SYSTEM FOR A VEHICLE

(71) Applicant: GM Global Technology Operations LLC, Detroit, MI (US)

(72) Inventors: Rodolfo Valiente Romero, Calabasas, CA (US); Hyukseong Kwon, Thousand Oaks, CA (US); Marcus James Huber, Saline, MI (US); Alireza Esna Ashari Esfahani, Novi, MI (US); Michael Cui, Winnetka, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 223 days.

(21) Appl. No.: 18/335,758

(22) Filed: Jun. 15, 2023

(65) Prior Publication Data

US 2024/0416929 A1    Dec. 19, 2024

(51) Int. Cl.
*B60W 50/02* (2012.01)
*B60W 50/00* (2006.01)
*B60W 60/00* (2020.01)

(52) U.S. Cl.
CPC .... *B60W 50/0205* (2013.01); *B60W 50/0097* (2013.01); *B60W 60/001* (2020.02); *B60W 2554/80* (2020.02); *B60W 2555/20* (2020.02)

(58) Field of Classification Search
CPC .......................... B60W 2555/20; B60W 60/001
See application file for complete search history.

(56) References Cited

U.S. PATENT DOCUMENTS 11,814,070 B1 * 11/2023 Prioletti ................. G05B 17/02

OTHER PUBLICATIONS

Aghakouchak, A. et al., "Modeling Radar Rainfall Estimation Uncertainties: Random Error Model", Journal of Hydrologic Engineering, Apr. 2010, pp. 265-274, vol. 15, Issue 10, American Society of Civil Engineers, Reston, VA, USA.
Ahmed, M. et al., "Driver Performance and Behavior in Adverse Weather Conditions: Microsimulation and Variable Speed Limit Implementation of the SHRP2 Naturalistic Driving Study Results-Phase 3", State of Wyoming Department of Transportation, Oct. 2021, Phase 3 Final Report, pp. 1-265.
Cabon, Y. et al., "Virtual KITTI 2.", arXiv preprint, arXiv:2001. 10773, Jan. 29, 2020, pp. 1-11, Naver Labs Europe, Meylan, France.
(Continued)

*Primary Examiner* — Imran K Mustafa
(74) *Attorney, Agent, or Firm* — Vivacqua Crane, PLLC

(57) ABSTRACT

An end-to-end perception perturbation modeling system for a vehicle includes one or more controllers storing a detection model in memory. The detection model includes a plurality of detection model plots that each indicate a probability value that an object in an environment surrounding the vehicle is detected based on a current weather condition and a distance measured between the vehicle and the object detected in the environment surrounding the vehicle. The one or more controllers execute instructions to receive an input state of the vehicle that is observed during non-inclement weather conditions and indicates one or more vehicle states, the current weather condition, and the distance. The controllers determine a perturbed state of the vehicle observed during the current weather condition.

20 Claims, 5 Drawing Sheets

(56) References Cited

OTHER PUBLICATIONS

Caesar, H. et al., "nuScenes: A Multimodal Dataset for Autonomous Driving," in 2020 IEEE/CVF Conference on Computer Vision and Pattern Recognition (CVPR), 2020, pp. 11618-11628, Seattle, WA, USA.

Deschaud, J., "KITTI-CARLA: a KITTI-like dataset generated by CARLA Simulator", arXiv preprint, arXiv:2109.00892., Aug. 17, 2021, Paris, France.

Dosovitskiy, A. et al., "CARLA: An Open Urban Driving Simulator", 1st Conference on Robot Learning, Oct. 18, 2017, pp. 1-16, https://doi.org/10.48550/arXiv.1711.03938.

Foi, A. et al., "Practical Poissonian-Gaussian Noise Modeling and Fitting for Single-Image Raw-Data", IEEE Transactions on Image Processing, Sep. 9, 2008, pp. 1737-1754, vol. 17, Institute of Electrical and Electronics Engineers, Manhattan, New York City, NY, US.

Geiger, A. et al., "Are We Ready for Autonomous Driving? The KITTI Vision Benchmark Suite", IEEE Conference on Computer Vision and Pattern Recognition, Jun. 16, 2012, pp. 3354-3361, Providence, RI, USA.

Jang, J. et al., "CarFree: Hassle-Free Object Detection Dataset Generation Using Carla Autonomous Driving Simulator", Applied Sciences, Jan. 2022, pp. 1-16, vol. 12 Issue 1, https://doi.org/10.3390/app12010281.

Lyssenko, M. et al., "Instance Segmentation in CARLA: Methodology and Analysis for Pedestrian-oriented Synthetic Data Generation in Crowded Scenes", IEEE/CVF International Conference on Computer Vision Workshops (ICCVW), 2021, pp. 988-996, Montreal, BC, CA.

Musat, V. et al., "Multi-Weather City: Adverse Weather Stacking for Autonomous Driving", IEEE/CVF International Conference on Computer Vision Workshops (ICCVW), 2021, pp. 2906-2915, Montreal, BC, CA.

Redmon, J. et al., "YOLOv3: An incremental improvement", eprint ArXiv:1804.02767v1, Apr. 2018, University of Washington, Seattle, WA, USA.

Richter, S. et al., "Playing for Benchmarks", IEEE International Conference on Computer Vision (ICCV), Sep. 21, 2017, pp. 2232-2241, Venice, Italy.

Ros, G. et al., "The SYNTHIA Dataset: A Large Collection of Synthetic Images for Semantic Segmentation of Urban Scenes", IEEE Conference on Computer Vision and Pattern Recognition (CVPR), 2016, pp. 3234-3243, Las Vegas, NV, USA.

Shabarek, A. "Deep Learning Framework for Freeway Speed Prediction in Adverse Weather", Transportation Research Record, (2020) pp. 28-41, vol. 2674, Issue 10, https://doi.org/10.1177/0361198120947421.

Sun, P. et al., "Scalability in Perception for Autonomous Driving: Waymo Open Dataset", IEEE/CVF Conference on Computer Vision and Pattern Recognition (CVPR), 2020, pp. 2443-2451, Seattle, WA, USA.

Trailovic, L. et al., "Position Error Modeling Using Gaussian Mixture Distributions With Application to Comparison of Tracking Algorithms", Proceedings of the 2003 American Control Conference, 2003, pp. 1272-1277, Denver, CO, USA, doi: 10.1109/ACC.2003.1239763.

Yu, F. et al., "BDD100K: A Diverse Driving Dataset for Heterogeneous Multitask Learning", 2020 IEEE/CVF Conference on Computer Vision and Pattern Recognition (CVPR), Apr. 8, 2020, pp. 2633-2642, Seattle, WA, USA.

Zhang, et al., "Perception and Sensing for Autonomous Vehicles Under Adverse Weather Conditions; A Survey", ISPRS Journal of Photogrammetry and Remote Sensing, Feb. 2023, pp. 146-177 vol. 196, Elsevier, Amsterdam, Netherlands.

\* cited by examiner

END-TO-END PERCEPTION PERTURBATION MODELING SYSTEM FOR A VEHICLE

INTRODUCTION

The present disclosure relates to an end-to-end perception perturbation modeling system for a vehicle, where the end-to-end perception perturbation modeling system accounts for adverse weather conditions.

An autonomous vehicle executes various tasks such as, but not limited to, perception, localization, mapping, path planning, decision-making, and motion control. For example, an autonomous vehicle may include perception sensors such as a camera for collecting image data regarding the environment surrounding the vehicle. Adverse weather conditions such as rain, fog, snow, or reduced illumination conditions that occur at dusk or night reduce visibility of surrounding objects, and therefore impact how an autonomous vehicle perceives the surrounding environment. As an example, the quality of the image data collected by a camera is greatly impacted by precipitation as well as reduced illumination. Thus, a successful approach used for object detection during clear weather conditions may not accurately detect objects during adverse weather conditions. However, current approaches ignore the impact adverse weather conditions have on perception systems for autonomous vehicles, and instead only consider average weather conditions or simply model a particular sensor's performance under different weather conditions.

In addition to the above-mentioned challenges, it is to be appreciated that autonomous vehicle tasks relating to perception require relatively large training datasets based on real-world conditions, both in general and for each specific adverse weather condition the vehicle may encounter. It is often very time-consuming and difficult to obtain the real-world data used to create the training dataset. In some instances, it may not be possible to obtain some of the data based on real-world conditions. To overcome this limitation, synthetic data generated based on one or more machine-learning techniques may be used instead. However, the synthetic data is based on real-world data, and therefore the quality of the synthetic data is limited by the capabilities of the machine-learning techniques as well as the real-world driving scenarios that exist within the existing data.

Thus, while object detection and perception systems for autonomous vehicles achieve their intended purpose, there is a need in the art for an improved approach for object detection and perception that considers adverse weather conditions in the absence of sufficient real-world data.

SUMMARY

According to several aspects, an end-to-end perception perturbation modeling system for a vehicle is disclosed. The end-to-end perception perturbation modeling system includes one or more controllers storing a detection model in memory. The detection model includes a plurality of detection model plots that each indicate a probability value that an object in an environment surrounding the vehicle is detected based on a current weather condition and a distance measured between the vehicle and the object detected in the environment surrounding the vehicle. The one or more controllers execute instructions to receive an input state of the vehicle, wherein the input state is observed during non-inclement weather conditions and indicates one or more vehicle states, the current weather condition, and the distance. The one or more controllers determine a probability value corresponding to the current weather condition and the distance based on the detection model. The one or more controllers execute a simulation based on the probability value, where the simulation determines a probability the object located in the environment is detected based on the current weather condition and the distance. In response to determining the probability the object located in the environment indicates the object will be detected, the one or more controllers determine a perturbed state of the vehicle observed during the current weather condition.

In an aspect, current weather condition indicates an adverse weather condition.

In another aspect, the adverse weather condition is one of the following: dusk, night, rain, heavy rain, fog, and heavy fog.

In yet another aspect, the one or more controllers store a set of vehicle state perturbation models that each correspond to one of the vehicle states in memory.

In an aspect, each set of vehicle state perturbation models include a plurality of vehicle state perturbation models that each represent a perception error distribution that corresponds to a specific current weather condition and a specific distance measured between the vehicle and the object detected in the environment.

In another aspect, the one or more controllers execute instructions to determine a perception error for each vehicle state during the current weather condition at the distance as indicated by the input state based on the set of vehicle state perturbation models.

In yet another aspect, the one or more controllers execute instructions to determine a correlation value between two perception errors corresponding to two of the vehicle states at the current weather condition and the distance as indicated by the input state, where the correlation value is representative of a functional relationship between two of the vehicle state perturbation models.

In an aspect, the one or more controllers execute instructions to compare the correlation value of the perception errors between the two vehicle states with an expected sensitivity value range, where the expected sensitivity value range indicates an expected difference between the perception errors of the two vehicle states, and in response to determining the correlation value falling within the expected sensitivity value range, determine the perception error between the two vehicle states is valid.

In another aspect, the one or more controllers execute instructions to determine the perturbed state of the vehicle by adding the perception error to each original value of the vehicle state.

In yet another aspect, the one or more vehicle states include one or more of the following: speed, a heading angle of the vehicle, and a location of the vehicle.

In an aspect, the detection model is created based on synthetic data.

In another aspect, the end-to-end perception perturbation modeling system is integrated with a trajectory prediction system and a final motion planner that are part of one of the following: an automated driving system (ADS) and an advanced driver assistance system (ADAS).

In an aspect, a method for determining a perturbed state of a vehicle by an end-to-end perception perturbation modeling system is disclosed. The method includes receiving, by one or more controllers, an input state of the vehicle, where the input state is observed during non-inclement weather conditions and indicates one or more vehicle states, a current weather condition, and a distance measured between the vehicle and an object detected in an environment surrounding the vehicle. The method includes determining a probability value corresponding to the current weather condition and the distance based on a detection model stored in memory of the one or more controllers, where the probability value indicates the object in the environment surrounding the vehicle is detected. The method includes executing a simulation based on the probability value, wherein the simulation determines a probability the object located in the environment is detected based on the current weather condition and the distance. Finally, in response to determining the probability the object located in the environment indicates the object will be detected, the method includes determining a perturbed state of the vehicle observed during the current weather condition.

In another aspect, the method includes determining a perception error for each vehicle state during the current weather condition at the distance as indicated by the input state based on a set of vehicle state perturbation models saved in memory of the one or more controllers, where each set of vehicle state perturbation models include a plurality of vehicle state perturbation models that each represent a perception error distribution that corresponds to a specific current weather condition and a specific distance measured between the vehicle and the object detected in the environment.

In yet another aspect, the method includes determining a correlation value between two perception errors corresponding to two of the vehicle states at the current weather condition and the distance as indicated by the input state, where the correlation value is representative of a functional relationship between two of the vehicle state perturbation models.

In an aspect, the method includes comparing the correlation value of the two perception errors between two of the vehicle states with an expected sensitivity value range, where the expected sensitivity value range indicates an expected difference between the perception errors of the two vehicle states, and in response to determining the correlation value falling within the expected sensitivity value range, determining the perception error between the two vehicle states is valid.

In another aspect, the method includes determining the perturbed state of the vehicle by adding the perception error to each original value of the vehicle state.

In an aspect, an end-to-end perception perturbation modeling system for a vehicle is disclosed. The end-to-end perception perturbation modeling system includes one or more controllers storing a detection model and a set of vehicle state perturbation models in memory, where the detection model is created based on synthetic data and includes a plurality of detection model plots that each indicate a probability value that an object in an environment surrounding the vehicle is detected based on a current weather condition and a distance measured between the vehicle and the object detected in the environment surrounding the vehicle, and where each set of vehicle state perturbation models include a plurality of vehicle state perturbation models that each represent a perception error distribution that corresponds to a specific current weather condition and a specific distance measured between the vehicle and the object detected in the environment, and where the one or more controllers execute instructions to receive an input state of the vehicle, wherein the input state is observed during non-inclement weather conditions and indicates one or more vehicle states, the current weather condition, and the distance. The one or more controllers determine a probability value corresponding to the current weather condition and the distance based on the detection model. The one or more controllers execute a simulation based on the probability value, where the simulation determines a probability the object located in the environment is detected based on the current weather condition and the distance. In response to determining the probability the object located in the environment indicates the object will be detected, the one or more controllers determine a perturbed state of the vehicle observed during the current weather condition, where the current weather condition indicates an adverse weather condition.

In another aspect, the one or more controllers execute instructions to determine a perception error for each vehicle state during the current weather condition at the distance as indicated by the input state based on the set of vehicle state perturbation models; and determine a correlation value between two perception errors between two of the vehicle states at the current weather condition and the distance as indicated by the input state, where the correlation value is representative of a functional relationship between two of the vehicle state perturbation models.

In yet another aspect, the one or more controllers execute instructions to compare the correlation value of the two perception errors between two of the vehicle states with an expected sensitivity value range, where the expected sensitivity value range indicates an expected difference between the perception errors of the two vehicle states and in response to determining the correlation value falling within the expected sensitivity value range, determine the perception error between the two vehicle states is valid, and determine the perturbed state of the vehicle by adding the perception error to each original value of the vehicle state.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
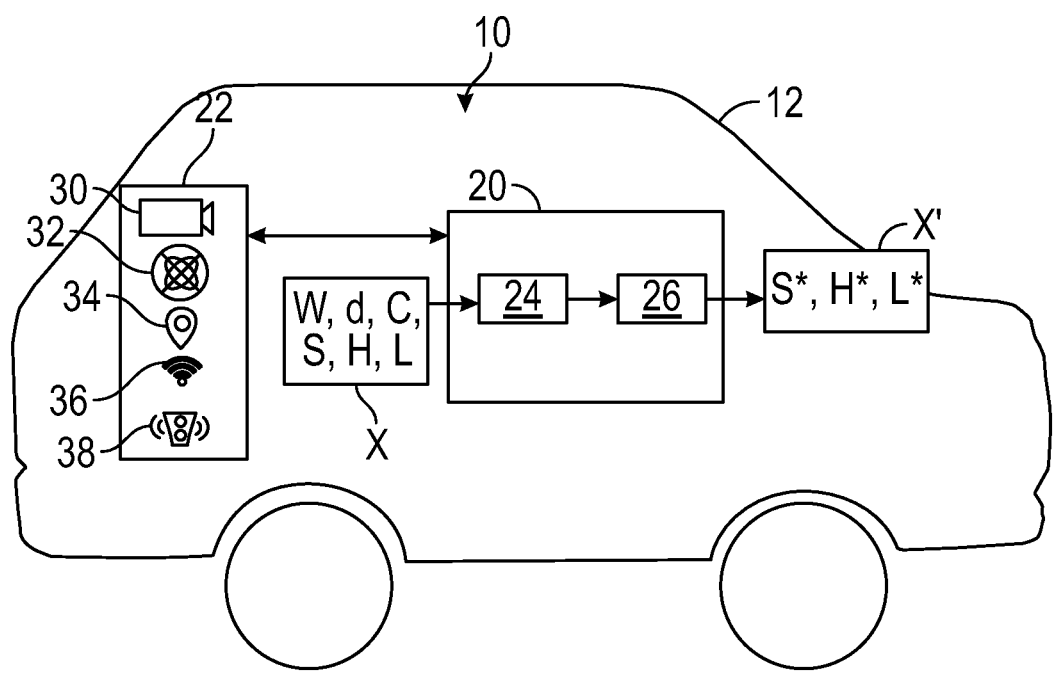
FIG. 1 is a schematic diagram of a vehicle including the disclosed end-to-end perception perturbation modeling system including one or more controllers, according to an exemplary embodiment.

Referring to FIG. 1, an exemplary end-to-end perception perturbation modeling system 10 for a vehicle 12 is illustrated. It is to be appreciated that the vehicle 12 may be any type of vehicle such as, but not limited to, a sedan, truck, sport utility vehicle, van, or motor home. The vehicle 12 includes either an automated driving system (ADS) or an advanced driver assistance system (ADAS) for assisting a driver with steering, braking, and/or accelerating. The end-to-end perception perturbation modeling system 10 includes one or more controllers 20 in electronic communication with a plurality of perception sensors 22 configured to collect perception data indicative of an environment surrounding the vehicle 12. In the non-limiting embodiment as shown in FIG. 1, the plurality of perception sensors 22 include one or more cameras 30, an inertial measurement unit (IMU) 32, a global positioning system (GPS) 34, radar 36, and LiDAR 38, however, is to be appreciated that additional sensors may be used as well.

As seen in FIG. 1, the one or more controllers 20 of the end-to-end perception perturbation modeling system 10 include a detection module 24 and a perturbation module 26. The one or more controllers 20 receive an input state X of the vehicle 12, where the input state X is observed by the plurality of perception sensors 22 during non-inclement weather conditions. The one or more controllers 20 determine a perturbed state X' of the vehicle 12, where the perturbed state X' of the vehicle 12 is observed by the plurality of perception sensors 22 during a current weather condition W. It is to be appreciated that the current weather condition W indicates an adverse weather condition that negatively impacts visibility of objects in the environment surrounding the vehicle 12. Moreover, it is also to be appreciated that the adverse weather conditions include reduced illumination conditions that occur at dusk or night. Some examples of adverse weather conditions include, but are not limited to, dusk, night, rain, heavy rain, fog, and heavy fog.

The input state X indicates one or more vehicle states, the current weather condition W, a distance d measured between the vehicle 12 and an object located in an environment surrounding the vehicle 12, and a class C of the object. In one non-limiting embodiment, the vehicle state includes speed S, a heading angle H, and a location L of the vehicle 12, however, it is to be appreciated that additional or different vehicle states may be included as well such as, for example, acceleration. As mentioned above, examples of the current weather condition W include, but are not limited to, non-inclement weather, dusk, night, rain, heavy rain, fog, and heavy fog. The object located in the environment surrounding the vehicle 12 represents a target object that the end-to-end perception perturbation modeling system 10 determines is detectable during the current weather condition W. Some examples of the class C of the object include, but are not limited to, vehicle, pedestrian, bicycle, or animal. It is to be appreciated that different object classes C produce different perturbation patterns that are part of a probability distribution that indicates if an object is detected, where the probability distribution for indicating an object is detected is described below.

The perturbed state X' indicates a probability that the object located in the environment is detected and one or more perturbed vehicle states, where the perturbed vehicle states are determined based on the current weather condition W. The probability that the object located in the environment is detected is expressed as either a true value or a false value (T/F), where the true value T indicates the object will be detected and the false value F indicates the object will not be detected. In the non-limiting embodiment as shown in FIG. 1, the perturbed vehicle states include a perturbed speed S*, a perturbed heading angle H*, and a perturbed location L* of the vehicle 12 that are observed during the current weather condition W. However, as mentioned above, other perturbed vehicle states may be used as well.

As explained below, the detection module 24 of the one or more controllers 20 receives the input state X and determines the probability the object located in the environment is detected based on the current weather condition W and the distance d measured between the vehicle 12 and the object located in the environment surrounding the vehicle 12. In response to determining the probability is the true value T, the perturbation module 26 of the one or more controllers 20 then determines the perturbed state X' of the vehicle 12. Thus, in the event the vehicle 12 encounters an adverse weather condition that affects visibility of the environment surrounding the vehicle 12, the disclosed the end-to-end perception perturbation modeling system 10 determines the probability an object is detected as well as the perturbed vehicle state X' observed during the current weather conditions W.

Figure 2:
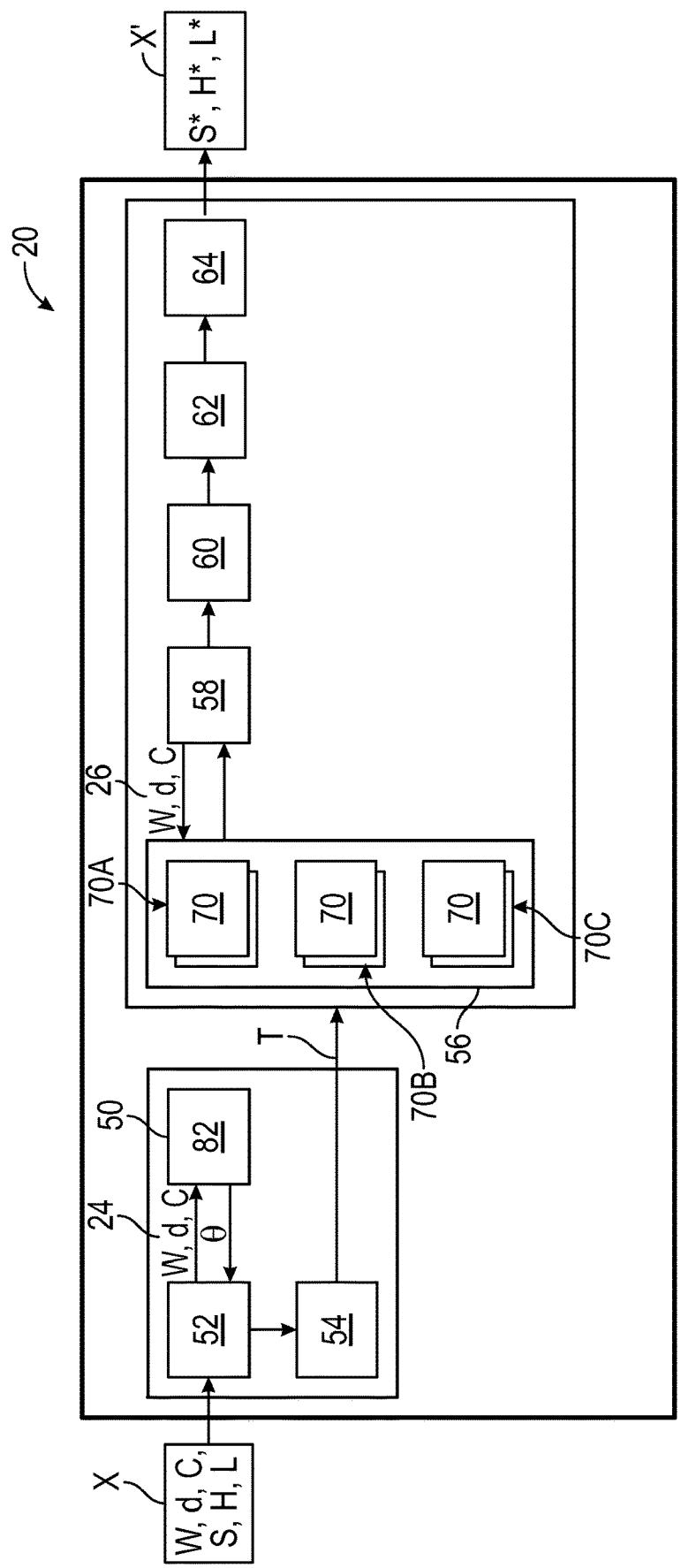
FIG. 2 illustrates the software architecture for the one or more controllers of the end-to-end perception perturbation modeling system shown in FIG. 1, according to an exemplary embodiment.

FIG. 2 illustrates the software architecture for the one or more controllers 20. The detection module 24 of the one or more controllers 20 includes a detection model bank 50, a detection model selector 52, and a probability calculation block 54. The perturbation module 26 of the one or more controllers 20 includes a perturbation model bank 56, a perturbation model selector 58, a sensitivity block 60, a correlation block 62, and a perturbation calculation block 64.

Figure 3:
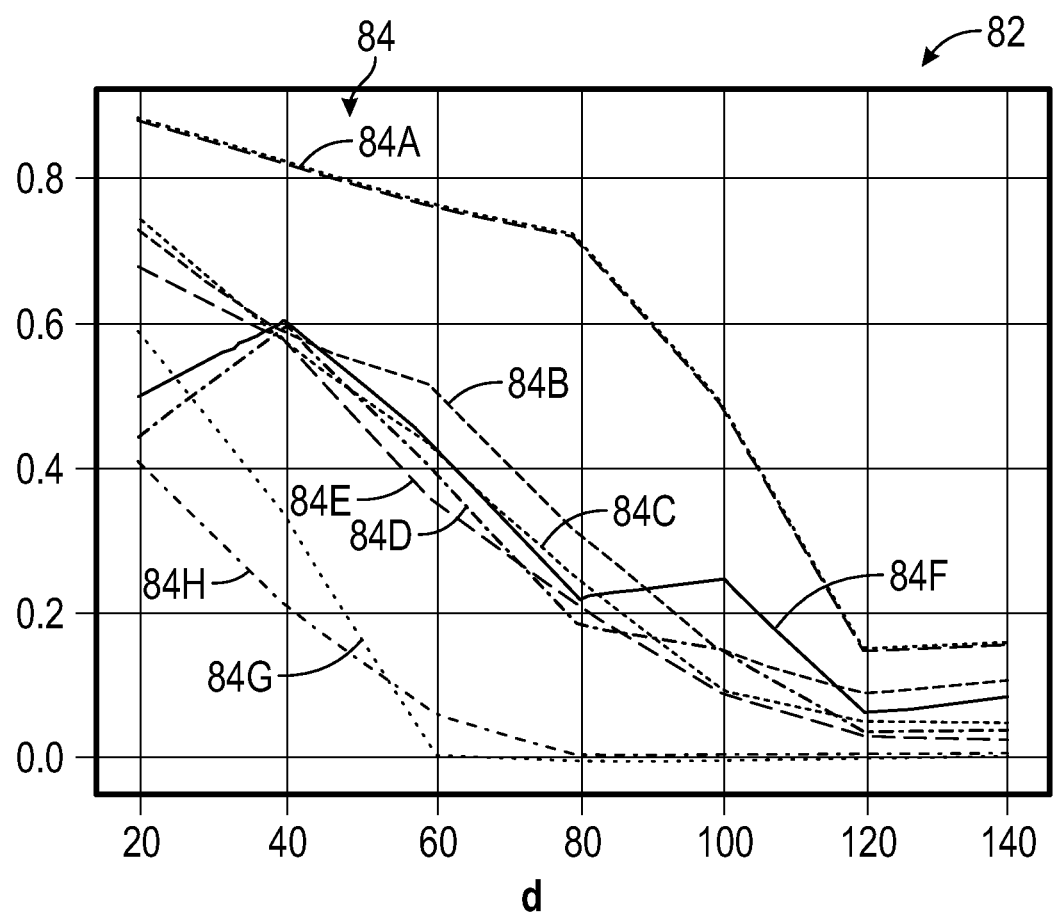
FIG. 3 illustrates an exemplary detection model including a plurality of detection model plots, according to an exemplary embodiment.

The detection module 24 shall now be described. The detection model bank 50 of the detection module 24 stores a detection model 82 in memory of the one or more controllers 20. Referring to FIG. 3, the detection model 82 includes a plurality of detection model plots 84 that each indicate a probability value that the object located in the environment surrounding the vehicle 12 is detected based on the current weather condition W and the distance d is detected based on perception data collected by the plurality of perception sensors 22 (FIG. 1). An x-axis of the detection model 82 represents the distance d between the vehicle 12 and the object, which is expressed as a bin distance that is measured in meters. The y-axis of the detection model 82 represents the probability that the object is detected, where the probability is determined based on a metric for evaluating object detection. In the example as shown in FIG. 3, the metric for evaluating object detection is the recall function that represents a ratio of the number of true positives to a sum of the true positives and false negatives. However, it is to be appreciated that other metrics may be used as well such as, for example, mean average precision (mAP). Each detection model plot 84 represents a weather condition. For example, the detection model plot 84A represents non-inclement weather, the detection model plot 64B represents rain, and the remaining detection model plots 84C-64H represent other adverse weather conditions such as fog, heavy fog, heavy rain, darkness, night, and dusk.

In one embodiment, the detection model 82 is created based on synthetic data, however, it is to be appreciated that real-world data may be used as well. The synthetic data is generated by one or more machine-learning techniques based on real-world data that is collected during non-inclement weather conditions. Specifically, in one embodiment, the synthetic data is created based on real-world data using a generative adversarial network (GAN), where the real-world data is modified to simulate a corresponding one of the adverse weather conditions. Referring to FIG. 3, each detection model plot 84 of the detection model 82 is determined by first determining if the object is detected at each of the distances d, where the real-world data is compared with ground truth data to determine a ratio of true positive detections, and the results are plotted as one of the detection model plots 84. A polynomial function that fits a corresponding one of the detection model plots 84 is then determined by an optimization problem that is expressed in Equation 1 as:

$$\text{minimize } \Sigma_i [\text{Recall}(W, D_i) - F(D_i, \theta)]^2 \qquad \text{Equation 1}$$

where $D_i$ represents the distance d at an ith distance value, $F(D_i, \theta)$ represents the polynomial function, and $\theta$ represents the coefficients of the polynomial function. In an embodiment, the polynomial function is expressed in Equation 2 as:

$$F(D_i, \theta) = a*D_i^3 + b*D_i^2 + c*D_i + d \qquad \text{Equation 2}$$

where $\theta=(a, b, c, d)$, and a, b, c, d are coefficients of the polynomial function.

Referring to FIGS. 2 and 3, the detection model selector 52 of the detection module 24 of the one or more controllers 20 determines a probability value corresponding to the current weather condition W, the distance d measured between the vehicle 12 and the object detected in the environment surrounding the vehicle 12 as indicated by the input state X, and the class C of the object based on the detection model 82 that is stored in the detection model bank 50. In the example as shown in FIG. 3, if the current weather condition indicates rain and the distance d is about 40 meters, then the probability value is about 0.6. The probability calculation block 54 of the detection module 24 of the one or more controllers 20 then executes a simulation based on the probability value, where the simulation determines the probability the object located in the environment is detected based on the current weather condition W and the distance d measured between the vehicle 12 and the object. As mentioned above, the probability the object located in the environment is detected is expressed as either the true value or the false value (T/F), where the true value T indicates the object will be detected and the false value F indicates the object will not be detected.

In one non-limiting embodiment, the probability calculation block 54 of the detection module 24 executes the simulation by first drawing a random number from a uniform distribution of values ranging from zero to one, and comparing the random number to the probability value, which is expressed in Equation 3 as:

$$p = rand(); \text{draw a random number from } [0, 1] \; p \sim U(0, 1) \qquad \text{Equation 3}$$

where p represents the random number. The random number is then compared to the probability value. In response to determining the random number is greater than the probability value, the probability calculation block 54 determines the object is detected, or the probability is true. Otherwise, the probability calculation block 54 determines the object is not detected, or the probability is false.

In response to the probability calculation block 54 of the detection module 24 of the one or more controllers 20 determining the probability the object located in the environment is detected includes the true value T, which indicates the object will be detected, the perturbation module 26 of the one or more controllers 20 then determines the one or more perturbed vehicle states that are observed during the current weather condition W at the distance d. The perturbation module 26 shall now be described. A plurality of vehicle state perturbation models 70 are stored by the perturbation model bank 56 in memory of the one or more controllers 20. Specifically, a set of vehicle state perturbation models 70A, 70B, 70C that each correspond to one of the vehicle states of the vehicle input X are stored in memory of the one or more controllers 20, where each set of vehicle state perturbation models 70A, 70B, 70C include a plurality of vehicle state perturbation models 70 that each represent a perception error distribution that corresponds to a specific current weather condition W and a specific distance d. Therefore, in the embodiment as shown in FIG. 2, the one or more vehicle state perturbation models 70 include a set of speed perturbation models 70A, a set of heading perturbation models 70B, and a set of localization perturbation models 70C. As an example, the set of speed perturbation models 70A include individual speed perturbation models 70 corresponding to a specific current weather condition W and a specific distance d.

Figure 4:
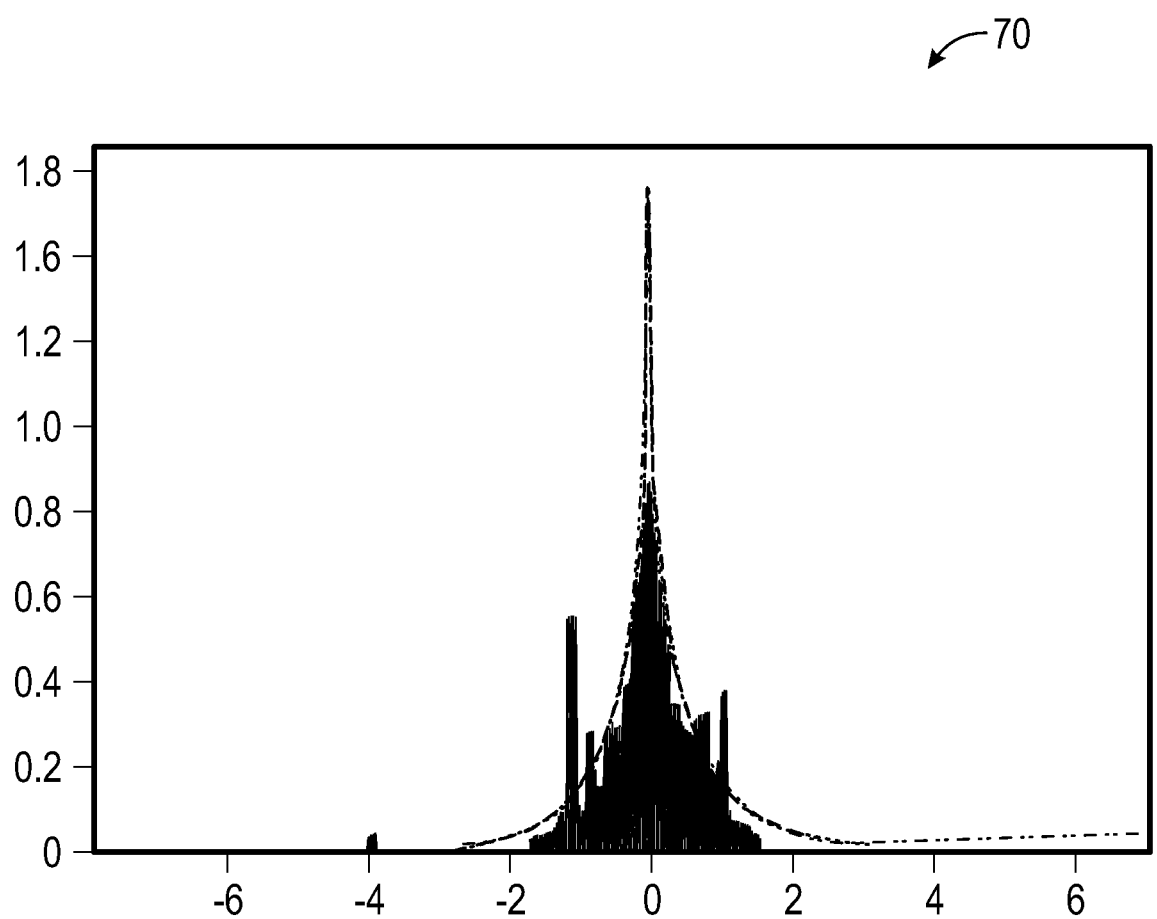
FIG. 4 illustrates an exemplary vehicle state perturbation model, according to an exemplary embodiment.

FIG. 4 illustrates an exemplary vehicle state perturbation model 70. Specifically, in the example as shown in FIG. 4, a speed perturbation model 70 is shown. The vehicle state perturbation model 70 includes an x-axis that indicates perception error and a y-axis that indicates a probability. Referring to both FIGS. 2 and 4, each vehicle state perturbation model 70 represents a probability distribution for the perception error that corresponds to a specific vehicle state, a specific current weather condition W, and a specific distance d. For example, the set of speed perturbation models 70A includes a plurality of vehicle state perturbation models 70 that each represent the speed at a specific weather condition at a specific distance d. In the example as shown in FIG. 4, the speed perturbation model 70 represents rain, where the distance d is about 20 meters.

The plurality of vehicle state perturbation models 70 that are stored in the perturbation model bank 56 of the perturbation module 26 are determined based on the following approach. First, a set of perception errors E are calculated for each vehicle state that is part of the vehicle input X, each weather condition, and each distance d. The perception errors E are expressed as E=GT−P, where GT represents ground truth data and P represents a predicted vehicle state.

A probability distribution of the perception error E is expressed as $P_i(x_i, \theta_i)$, where $P_i$ is the probability distribution, $x_i$ represents one of the vehicle states, and $\theta_i$ represents the parameters of the probability distribution $P_i$. It is to be appreciated that a set of probability distributions are calculated for each set of perception errors E, where the set of probability distributions include a predefined number N of candidate probability distributions {P1, P2, P3 . . . . PN}. Each candidate probability distribution represents a different type of probability distribution such as, for example, normal, Poisson, Gamma, and hyperbolic. For each set of perception errors E, a best fit probability distribution is identified from the predefined number N of candidate probability distributions.

The best fit probability distribution for each set of perception errors is determined by first calculating the parameters $\theta_{ij}$ of the probability distribution $P_i$ based on the maximum likelihood estimation (MLE) algorithm, and is defined in Equation 4 as:

$$\theta_{ij}^{MLE} = \arg\max_{\theta_{ij}} \sum \log(P_{ij}(x_i; \theta_{ij}))  \quad \text{Equation 4}$$

The best fit probability distribution is then found based on the Kolmogorov-Smirnov test. The Kolmogorov-Smirnov test compares an empirical distribution function $F(x_i)$ with a cumulative distribution function (CDF) of each candidate probability distribution, and is expressed in Equation 5 as:

$$j_{best} = \arg\min_{j} \max |F(x_i) - P_{ij}^{CDF}(x_i; \theta_{ij}^{MLE})| \quad \text{Equation 5}$$

where $j_{best}$ represents the best fit probability distribution and $P_{ij}^{CDF}$ and $(x_i; \theta_{ij}^{MLE})$ represent the CDF of the j-th candidate probability distribution with MLE parameters. The best fit probability distribution is then selected, and represents the vehicle state perturbation model 70 that corresponds to a specific vehicle state at a specific weather condition and a specific distance d. It is to be appreciated that the best fit probability distribution is determined for each vehicle state that is part of the vehicle input X, each weather condition, and each distance d.

Determining the one or more perturbed vehicle states that are observed during the current weather condition W at the distance d by the perturbation module 26 of the one or more controllers 20 shall now be described. The perturbation model selector 58 of the perturbation module 26 determines a perception error for each vehicle state during the current weather condition W at the distance d as indicated by the input state X based on the set of vehicle state perturbation models 70A, 70B, 70C stored by the perturbation model bank 56. In the example as shown in FIG. 2, the perturbation model selector 58 of the perturbation module 26 determines a speed perception error $S_{error}$ from one of the vehicle state perturbation models 70 from the set of speed perturbation models 70A, a heading perception error $H_{error}$ from the set of heading perturbation models 70B, and a location perception error $L_{error}$ from the set of localization perturbation models 70C. For example, the speed perception error $S_{errorw}$ is 0.3, the heading perception error $H_{error}$ is 0.1, and the location perception error $L_{error}$ is (0.4, 0.8).

It is to be appreciated that the set of vehicle state perturbation models 70A, 70B, 70C stored by the perturbation model bank 56 are not independent of one another. Instead, it is to be appreciated that a functional relationship exists between the values for each set of vehicle state perturbation models, and the values are correlated to one another. Specifically, for example, the set of speed perturbation models 70A are highly related to the localization perturbation models 70C since the perception error associated with speed is highly correlated to a location of the vehicle 12. The sensitivity block 60 of the perturbation module 26 determines a correlation value between two perception errors between two of the vehicle states at the current weather condition W and the distance d as indicated by the input state X, where the correlation value is representative of a functional relationship between the two perturbation models 70.

The correlation block 62 of the perturbation module 26 compares the correlation value of the two perception errors between two of the vehicle states with an expected sensitivity value range, where the expected sensitivity value range indicates an expected difference between the perception errors of the two vehicle states. In response to the correlation value falling within the expected sensitivity value range, the correlation block 62 determines the perception error between the two vehicle states is valid, and the perturbation calculation block 64 determines the perturbed state of the vehicle 12 observed during the current weather condition. Otherwise, the correlation block 62 determines the perception error between the two vehicle states is invalid, and the perturbation model selector 58 of the perturbation module 26 may redetermine the perception error between the two vehicle states.

The perturbation calculation block 64 of the perturbation module 26 of the one or more controllers 20 then determines the perturbed vehicle state of the perturbed state X' of the vehicle 12 by adding the perception error to each original value of the vehicle state. For example, if the vehicle state includes an original value for speed S that is 21 kilometers per hour (kph), then perturbation calculation block 64 would add the speed perception error $S_{errorw}$ of 0.3 to the original value for speed so the perturbed speed S* of the perturbed vehicle state would be 21.3 kph. In the present example, if the heading angle H is 45 degrees, then the perturbation calculation block 64 would add the heading perception error $H_{error}$ of 0.1 to the original value for heading so the perturbed heading H* of the perturbed vehicle state would be 45.1 degrees.

Referring to FIGS. 1 and 2, is to be appreciated that the end-to-end perception perturbation modeling system 10 is integrated with a trajectory prediction system and a final motion planner that are part of the ADS or ADAS of the vehicle 12 (which is useful as a tool to assess the perception of other vehicles by modeling the perception under different conditions). The end-to-end perception perturbation modeling system 10 improves trajectory prediction as well as final motion planning by determining if the vehicle 12 perceives objects during adverse weather conditions. For example, a vehicle located in the environment surrounding the vehicle 12 that are visible during non-inclement weather conditions may not be perceived during adverse weather conditions because of limited visibility. Moreover, the trajectory prediction system and the final motion planner of the vehicle 12 are aware that the other vehicle located in the environment may not perceive the ego vehicle (i.e., the vehicle 12) during adverse weather conditions as well and utilizes this information during final motion planning.

Figure 5:
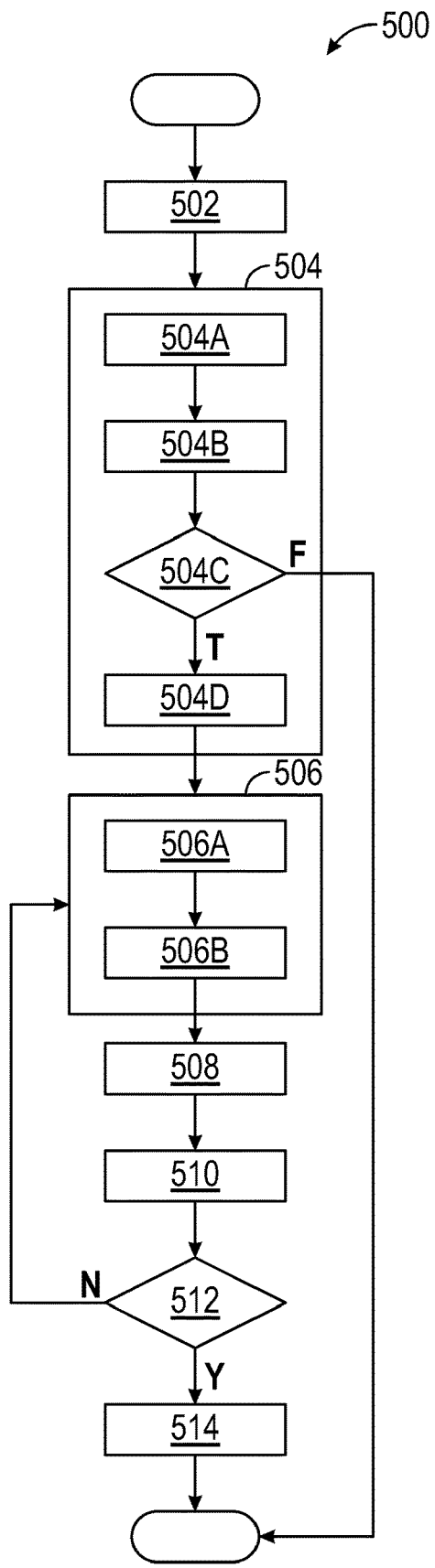
FIG. 5 is a process flow diagram illustrating a method for determining a perturbed state of the vehicle using the end-to-end perception perturbation modeling system shown in FIG. 1, according to an exemplary embodiment.

FIG. 5 illustrates a process flow diagram illustrating an exemplary method 500 for determining the perturbed state X' of the vehicle 12 by the end-to-end perception perturbation modeling system 10 shown in FIG. 1. Referring generally to FIGS. 1-5, the method 500 may begin at block 502. In block 502, the detection module 24 of the one or more controllers 20 receives the input state X of the vehicle 12 (shown in FIG. 1), wherein the input state X is observed during non-inclement weather conditions and indicates one or more vehicle states, the current weather condition W, and the distance d. The method 500 may then proceed to block 504.

In block 504, the detection model selector 52 of the detection module 24 of the one or more controllers 20 (shown in FIG. 2) determine the probability value corresponding to the current weather condition W and the distance d based on the detection model 82. Specifically, block 504 includes blocks 504A-504D that determine the probability value. In block 504A, the detection model selector 52 of the detection module 24 of the one or more controllers 20 determines a probability value corresponding to the current weather condition W, the distance d measured between the vehicle 12 and the object detected in the environment surrounding the vehicle 12 as indicated by the input state X, and the class C of the object based on the detection model 82 that is stored in the detection model bank 50. The method 500 may then proceed to block 504B, where the probability calculation block 54 of the detection module 24 executes a simulation by first drawing a random number p, which is expressed in Equation 3 above. The method 500 may then proceed to decision block 504C. In decision block 504C, the probability calculation block 54 of the detection module 24 compares the random number p with the probability value. In response to determining the random number p is less than the probability value and the probability is false, the method 500 may terminate. Otherwise, the method 500 proceeds to block 504D, where the probability calculation block 54 of the detection module 24 determines the object is detected and the probability is true. The method 500 may then proceed to block 506.

In block 506, in response to determining the probability the object located in the environment indicates the object will be detected, the one or more controllers 20 determine the perturbed state X' of the vehicle 12 observed during the current weather condition W. Specifically, the perturbation model selector 58 of the perturbation module 26 of the one or more controllers 20 determine the perception error for each vehicle state during the current weather condition W at the distance d as indicated by the input state X based on the set of vehicle state perturbation models 70A, 70B, 70C. Block 506B includes blocks 506A-506B that determine the probability value. In block 506A, the perturbation model selector 58 of the perturbation module 26 selects the appropriate vehicle state perturbation model 70A, 70B, 70C for each vehicle state based on the current weather condition W and the distance d. The method 500 may then proceed to block 506B. In block 506B, the perturbation model selector 58 of the perturbation module 26 determines the perception error for each vehicle state based on the appropriate vehicle state perturbation model 70A, 70B, 70C selected in block 506B. The method 500 may then proceed to block 508.

In block 508, the sensitivity block 60 of the perturbation module 26 of the one or more controllers 20 determine the correlation value between two perception errors between two of the vehicle states at the current weather condition W and the distance d as indicated by the input state X, where the correlation value is representative of a functional relationship between the two perturbation models. The method 500 may then proceed to block 510.

In block 510, the correlation block 62 of the perturbation module 26 of the one or more controllers 20 compare the correlation value of the perception errors between the two vehicle states with an expected sensitivity value range. The expected sensitivity value range indicates an expected difference between the perception errors of the two vehicle states. The method 500 may then proceed to decision block 512.

In decision block 512, in response to the correlation value failing outside the sensitivity value range, the method returns to block 506. In response to determining the correlation value falls within the expected sensitivity value range, the method 500 proceeds to block 514. In block 514, the perturbation calculation block 64 of the perturbation module 26 of the one or more controllers 20 determines the perturbed state X' of the vehicle by adding the perception error to each original value of the vehicle state. The method 500 may then terminate.

Referring generally to the figures, the disclosed end-to-end perception perturbation modeling system provides various technical effects and benefits. Specifically, the end-to-end perception perturbation modeling system provides an approach for detecting objects during adverse weather conditions such as rain, reduced lighting, and fog, which impact the visibility of objects in the environment surrounding the vehicle. It is also to be appreciated that gathering real-world data for a training dataset is relatively time-consuming, and in some instances may not be possible to obtain. The end-to-end perception perturbation modeling system obviates the need for real-world data by building models based on synthetic data instead.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An end-to-end perception perturbation modeling system for a vehicle, the end-to-end perception perturbation modeling system comprises:
one or more controllers storing a detection model in memory, wherein the detection model includes a plurality of detection model plots that each indicate a probability value that an object in an environment surrounding the vehicle is detected based on a current weather condition and a distance measured between the vehicle and the object detected in the environment surrounding the vehicle, and wherein the one or more controllers execute instructions to:
receive an input state of the vehicle, wherein the input state is observed during non-inclement weather conditions and indicates one or more vehicle states, the current weather condition, and the distance;
determine a probability value corresponding to the current weather condition and the distance based on the detection model;
execute a simulation based on the probability value, wherein the simulation determines a probability the object located in the environment is detected based on the current weather condition and the distance, and wherein the simulation is executed by:
drawing a random number;
comparing the random number with the probability value; and
in response to determining the random number is equal to or greater than the probability value, determine the object is detected and the probability is true; and in response to determining the probability the object located in the environment indicates the object will be detected, determine a perturbed state of the vehicle observed during the current weather condition, wherein the perturbed state of the vehicle indicates the probability that the object located in the environment is detected, and wherein the end-to-end perception perturbation modeling system is integrated with a trajectory prediction system and a final motion planner of an autonomous driving system that execute trajectory prediction and final motion planning of the vehicle based on the probability the object located in the environment is detected.

2. The end-to-end perception perturbation modeling system of claim 1, wherein the current weather condition indicates an adverse weather condition.

3. The end-to-end perception perturbation modeling system of claim 2, wherein the adverse weather condition is one of the following: dusk, night, rain, heavy rain, fog, and heavy fog.

4. The end-to-end perception perturbation modeling system of claim 1, wherein the one or more controllers store a set of vehicle state perturbation models that each correspond to one of the vehicle states in memory.

5. The end-to-end perception perturbation modeling system of claim 4, wherein each set of vehicle state perturbation models include a plurality of vehicle state perturbation models that each represent a perception error distribution that corresponds to a specific current weather condition and a specific distance measured between the vehicle and the object detected in the environment.

6. The end-to-end perception perturbation modeling system of claim 5, wherein the one or more controllers execute instructions to:
determine a perception error for each vehicle state during the current weather condition at the distance as indicated by the input state based on the set of vehicle state perturbation models.

7. The end-to-end perception perturbation modeling system of claim 6, wherein the one or more controllers execute instructions to:
determine a correlation value between two perception errors corresponding to two of the vehicle states at the current weather condition and the distance as indicated by the input state, wherein the correlation value is representative of a functional relationship between two of the vehicle state perturbation models.

8. The end-to-end perception perturbation modeling system of claim 7, wherein the one or more controllers execute instructions to:
compare the correlation value of the perception errors between the two vehicle states with an expected sensitivity value range, wherein the expected sensitivity value range indicates an expected difference between the perception errors of the two vehicle states; and
in response to determining the correlation value falling within the expected sensitivity value range, determine the perception error between the two vehicle states is valid.

9. The end-to-end perception perturbation modeling system of claim 8, wherein the one or more controllers execute instructions to:
determine the perturbed state of the vehicle by adding the perception error to each original value of the vehicle state.

10. The end-to-end perception perturbation modeling system of claim 1, wherein the one or more vehicle states include one or more of the following: speed, a heading angle of the vehicle, and a location of the vehicle.

11. The end-to-end perception perturbation modeling system of claim 1, wherein the detection model is created based on synthetic data.

12. The end-to-end perception perturbation modeling system of claim 1, wherein the autonomous driving system is part of one of the following: an automated driving system (ADS) and an advanced driver assistance system (ADAS).

13. A method for determining a perturbed state of a vehicle by an end-to-end perception perturbation modeling system, the method comprising:
receiving, by one or more controllers, an input state of the vehicle, wherein the input state is observed during non-inclement weather conditions and indicates one or more vehicle states, a current weather condition, and a distance measured between the vehicle and an object detected in an environment surrounding the vehicle;
determining a probability value corresponding to the current weather condition and the distance based on a detection model stored in memory of the one or more controllers, wherein the probability value indicates the object in the environment surrounding the vehicle is detected;
executing a simulation based on the probability value, wherein the simulation determines a probability the object located in the environment is detected based on the current weather condition and the distance, and wherein the simulation is executed by:
drawing a random number;
comparing the random number with the probability value; and
in response to determining the random number is equal to or greater than the probability value, determine the object is detected and the probability is true; and
in response to determining the probability the object located in the environment indicates the object will be detected, determining a perturbed state of the vehicle observed during the current weather condition, wherein the perturbed state of the vehicle indicates the probability that the object located in the environment is detected, and wherein the end-to-end perception perturbation modeling system is integrated with a trajectory prediction system and a final motion planner of an autonomous driving system that execute trajectory prediction and final motion planning of the vehicle based on the probability the object located in the environment is detected.

14. The method of claim 13, further comprising:
determining a perception error for each vehicle state during the current weather condition at the distance as indicated by the input state based on a set of vehicle state perturbation models saved in memory of the one or more controllers, wherein each set of vehicle state perturbation models include a plurality of vehicle state perturbation models that each represent a perception error distribution that corresponds to a specific current weather condition and a specific distance measured between the vehicle and the object detected in the environment.

15. The method of claim 14, further comprising:
determining a correlation value between two perception errors corresponding to two of the vehicle states at the current weather condition and the distance as indicated by the input state, where the correlation value is representative of a functional relationship between two of the vehicle state perturbation models.

16. The method of claim 15, further comprising:
comparing the correlation value of the two perception errors between two of the vehicle states with an expected sensitivity value range, wherein the expected sensitivity value range indicates an expected difference between the perception errors of the two vehicle states; and
in response to determining the correlation value falling within the expected sensitivity value range, determining the perception error between the two vehicle states is valid.

17. The method of claim 16, further comprising:
determining the perturbed state of the vehicle by adding the perception error to each original value of the vehicle state.

18. An end-to-end perception perturbation modeling system for a vehicle, the end-to-end perception perturbation modeling system comprising:
one or more controllers storing a detection model and a set of vehicle state perturbation models in memory, wherein the detection model is created based on synthetic data and includes a plurality of detection model plots that each indicate a probability value that an object in an environment surrounding the vehicle is detected based on a current weather condition and a distance measured between the vehicle and the object detected in the environment surrounding the vehicle, and wherein each set of vehicle state perturbation models include a plurality of vehicle state perturbation models that each represent a perception error distribution that corresponds to a specific current weather condition and a specific distance measured between the vehicle and the object detected in the environment, and wherein the one or more controllers execute instructions to:
receive an input state of the vehicle, wherein the input state is observed during non-inclement weather conditions and indicates one or more vehicle states, the current weather condition, and the distance;
determine a probability value corresponding to the current weather condition and the distance based on the detection model;
execute a simulation based on the probability value, wherein the simulation determines a probability the object located in the environment is detected based on the current weather condition and the distance, and wherein the simulation is executed by:
drawing a random number;
comparing the random number with the probability value; and
in response to determining the random number is equal to or greater than the probability value, determine the object is detected and the probability is true; and
in response to determining the probability the object located in the environment indicates the object will be detected, determine a perturbed state of the vehicle observed during the current weather condition, wherein the current weather condition indicates an adverse weather condition, wherein the perturbed state of the vehicle indicates the probability that the object located in the environment is detected, and wherein the end-to-end perception perturbation modeling system is integrated with a trajectory prediction system and a final motion planner of an autonomous driving system that execute trajectory prediction and final motion planning of the vehicle based on the probability the object located in the environment is detected.

19. The end-to-end perception perturbation modeling system of claim 18, wherein the one or more controllers execute instructions to:
determine a perception error for each vehicle state during the current weather condition at the distance as indicated by the input state based on the set of vehicle state perturbation models; and determine a correlation value between two perception errors between two of the vehicle states at the current weather condition and the distance as indicated by the input state, where the correlation value is representative of a functional relationship between two of the vehicle state perturbation models.

20. The end-to-end perception perturbation modeling system of claim 19, wherein the one or more controllers execute instructions to:
compare the correlation value of the two perception errors between two of the vehicle states with an expected sensitivity value range, wherein the expected sensitivity value range indicates an expected difference between the perception errors of the two vehicle states;
in response to determining the correlation value falling within the expected sensitivity value range, determine the perception error between the two vehicle states is valid; and
determine the perturbed state of the vehicle by adding the perception error to each original value of the vehicle state.

* * * * *